United States Patent Office 2,847,399
Patented Aug. 12, 1958

2,847,399

VINYL ETHERS OF SUBSTITUTED BIURETS, THEIR POLYMERS, AND THEIR PREPARATION

Sidney Melamed, Philadelphia, Pa., assignor to Rohm & Haas Company, Philadelphia, Pa., a corporation of Delaware No Drawing. Application October 8, 1954
Serial No. 461,287

16 Claims. (Cl. 260—77.5)

This invention relates to new unsaturated organic compounds and their polymers. More particularly, it relates to new unsaturated derivatives of alkylolamines and to their polymerization products.

An object of the present invention is to provide a new class of monoethylenically unsaturated ethers of substituted biurets which are stable under ordinary conditions but which can be converted to polymers and copolymers of useful properties. Other objects will be apparent from the description of the invention given hereinafter.

The above objects are accomplished according to the present invention by providing a class of unsaturated ethers having the general Formula I (I)  $CH_2=CHOANRCONHCONH_2$ in which A is an alkylene group of 2 to 18 carbon atoms of straight or branched chain character which may comprise cyclohexyl or other saturated alkyl as well as unsaturated aliphatic hydrocarbon substituents, such as methyl, ethyl, hexadecyl, vinyl, allyl, or dodecenyl groups in the branched portions thereof, at least 2 of the carbon atoms of A separating the adjoining oxygen atom from the adjacent nitrogen atom, and R is hydrogen, benzyl or an alkyl group of 1 to 18 carbon atoms including cyclohexyl.

The monomeric compounds of this invention may be prepared in either of two ways. In the first, an amino-vinyl ether of the Formula II (II)  $CH_2=CHOANHR$ is reacted with an alkyl allophanate of the Formula III (III)  $R'OCONHCONH_2$ in which R' is any alkyl group, such as those having 1 to 18 carbon atoms, and is preferably methyl. The alkyl allophanate may also be called an alkyl carbamylcarbamate. The reaction is preferably carried out in the presence of at least a small amount of water at temperatures of 20° to 100° C., preferably about 60° to 80° C., for 6 to 40 hours. The alcohol R'OH is liberated as a by-product and may be stripped with water by heating and evaporation thereof, leaving the biuret derivative of Formula I behind.

Examples of amino-vinyl ethers of Formula II that may be used include the following:

$CH_2=CHOCH_2CH_2NH_2$
$CH_2=CHOCH_2CH_2NHCH_3$
$CH_2=CHOCH_2CH_2CH_2NH_2$
$CH_2=CHOCH_2CH(CH_3)NH_2$
$CH_2=CHOCH(CH_3)CH_2NH_2$
$CH_2=CHOCH_2C(CH_3)_2NH_2$
$CH_2=CHOC(CH_3)_2CH_2NH_2$
$CH_2=CHOCH_2CH_2CH_2CH_2NH_2$
$CH_2=CHOC(CH_3)_2CH_2CH(CH_3)NH_2$
$CH_2=CHOCH_2CH_2CH(CH_3)(CH_2)_3C(CH_3)_2NH_2$
$CH_2=CHOCH_2C(CH_3)_2CH_2NH_2$
$CH_2=CHOCH_2CH(CH_3)NHCH_3$

The vinyl aminoalkyl ether may have an N-substituent (R) other than hydrogen and the preferred methyl group, such as ethyl, butyl, benzyl, methylbenzyl, cyclohexyl, and so on, typical compounds then being $CH_2=CHOCH_2CH_2NHC_4H_9$ (distilling at 88° to 99° C./120 mm.), $CH_2=CHOCH(CH_3)CH_2NHC_2H_5$ (distilling at 72° to 73° C./120 mm.), $CH_2=CHOCH_2CH_2NHCH_2C_6H_5$
$CH_2=CHOCH_2CH_2NHC_6H_{11}$ in which $C_6H_{11}$ is cyclohexyl.

Alternatively, certain products within the scope of Formula I which have the structure of Formula IV (IV)  $CH_2=CHOYC(CH_3)_2NRCONHCONH_2$ in which R is as defined hereinabove and Y is a straight or branched chain alkylene group of 1 to 15 carbon atoms, may be obtained by reacting an isocyanate of the Formula V (V)  $CH_2=CHOYC(CH_3)_2NCO$ with urea at a temperature of 20° C. to 100° C. for 1 to 6 hours, preferably but not necessarily in a solvent, such as acetonitrile, benzene, or dimethylformamide, preferably but again optionally in the presence of a small amount of a basic catalyst, such as benzyldimethylamine. Examples of isocyanates of Formula V include $CH_2=CHOCH_2C(CH_3)_2NCO$
$CH_2=CHOC_2H_4CH(CH_3)C_3H_6C(CH_3)_2NCO$ which may be prepared in the manner described in co-pending application Serial No. 348,107, filed April 10, 1953, now U. S. Patent 2,727,020, in the hands of a common assignee.

The monomeric products of Formula I are generally colorless or white solids which are stable under ordinary conditions. The monomers of this invention are useful per se, for example as plasticizers for regenerated cellulose film, and they are also useful as intermediates for numerous other chemicals in view of the presence in the molecule of a reactive double bond capable of adding to many other molecules. However, the monomers can be converted to polymers and copolymers under the influence of heat and/or suitable polymerization initiators or catalysts, especially of the acyclic azo type. These new vinyl ether monomers are not subject to chain transfer during polymerization so that high molecular weight polymers can be readily made. These polymers which contain oxyalkylbiuret groups as side chains are useful in various applications for which polymeric materials are normally suitable, such as for plastics, coatings, films, etc. Polymers of such monomers as acrylonitrile, which are relatively unreceptive to dyeing, have their dye-receptivity improved by copolymerization with about 5% to 20% or more by weight of a monomer of Formula I or a mixture of two or more of such monomers. The homo-polymers of the compounds of Formula I are insoluble in water. Solvent-soluble polymers or copolymers of one or more compounds of Formula I with or without one or more comonomers of another type, such as a copolymer of 2% to 10% by weight of $CH_2=CHOC_2H_4NHCONHCONH_2$ with 98% to 90% by weight of methyl acrylate or methyl methacrylate, can be formed into solvent-soluble coatings or films which can then be converted to insoluble condition by reaction with an aldehyde, such as formaldehyde, or formaldehyde-containing condensates, in the presence of an acid, such as hydrochloric or acetic acid, as a catalyst. The polymers and copolymers of the compounds of Formula I can be methylolated with formaldehyde to a water-soluble condition in which they are useful for increasing the wet-strength of paper, and for the treatment of textiles, as in crease-proofing, etc. The water-soluble methylolated derivatives are valuable adjuncts to other thermosetting aminoplast condensation products, such as those of urea-formaldehyde, melamine-formaldehyde, and diethylene glycol-bis-carbamate-formaldehyde, for various purposes and uses, such as adhesives and laminating compositions, especially plywood adhesives, coating compositions and molding compositions.

The polymerization or copolymerization may be most expeditiously effected by heating a mixture of the azo catalyst and the monomer or mixture of monomers comprising at least one of the structure of Formula I with or without an inert solvent, such as isopropanol, acetone, or dimethylformamide to a temperature of about 60° to 100° C. until the desired extent of polymerization is attained. Examples of acyclic azo initiators or catalysts include azodiisobutyronitrile, azodiisobutyramide, dimethyl (or diethyl or dibutyl) azodiisobutyrate, azobis($\alpha,\gamma$-dimethylvaleronitrile), azobis($\alpha$-methylbutyronitrile), azobis($\alpha$-methylvaleronitrile), dimethyl azobismethylvalerate, and the like.

The new monomeric compounds of this invention may be copolymerized with other polymerizable olefinically unsaturated compounds, especially the monoethylenically unsaturated type or the vinylidene type under the influence of a polymerization initiator of the free radical type, such as peroxides or the acyclic azo compounds mentioned above. With an azo catalyst temperatures between 50° and about 100° C. are generally effective for copolymerizing. Somewhat higher temperatures are useful when catalysts of the peroxidic type are used, temperatures between 75° and 150° C. being practical, the above temperatures being those observed for copolymerization in bulk or in solution. Temperatures between 0° and 100° C. or more are useful when copolymerization is carried out in aqueous suspensions or in emulsions using non-ionic emulsifiers, such as octylphenoxypolyethoxyethanol.

The same azo catalysts described above for use in forming polymers are used for preparing copolymers, particularly when the major portion of the monomers is a vinyl ether of the invention. The amount of catalyst may be varied between 0.1% and 5% of the weight of the monomers to be copolymerized. A range from 0.3% to 1% is preferred, at least at the start. Small amounts of catalyst may be added from time to time as copolymerization proceeds.

When a vinyl ether of the invention furnishes the minor portion of an interpolymer, however, other free radical catalysts may prove desirable. For example, organic peroxides, such as butyl perbenzoate, or benzoyl peroxide, are suitable for polymerization in bulk or in solution, while ammonium persulfate and the like are useful in the polymerization of dispersions.

As useful unsaturated compounds for forming copolymers with the compounds of Formula I there may be used acrylic acid, methacrylic acid, esters of acrylic acid or methacrylic acid and monohydric alcohols such as methyl, ethyl, butyl, octyl, dodecyl, cyclohexyl, allyl, methallyl, undecenyl, cyanoethyl, aminoethyl, and the like; esters of itaconic acid and similar alcohols; esters from maleic, fumaric or citraconic acids, and likewise similar alcohols; vinyl esters or carboxylic acids such as acetic, propionic, butyric, and the like; vinyloxyalkyl esters such as vinyloxyethyl acetate, etc.; vinyl ethers such as ethyl vinyl ether, butyl vinyl ether, octyl vinyl ether, allyl vinyl ether, hydroxyethyl vinyl ether, aminoethyl vinyl ether, aminopropyl vinyl ether, dimethylaminoethyl vinyl ether, vinyl-oxyethoxyethanol, vinyloxypropoxyethanol; methacrylonitrile or acrylonitrile; acrylamide, or methacrylamide, and N-substituted amides of these types; vinyl chloride, vinyl bromide, vinylidene chloride, 1-chloro-1-fluoroethylene, or ethylene; 1-acetoxy-1,3-butadiene; styrene, 2-vinylpyridine, 4-vinylpyridine, or divinylbenzene; ethylene diacrylate or dimethacrylate, bis(vinoxyethyl)urea, vinoxyethyl acrylate, vinoxypropyl acrylate, etc. Where two polymerizable vinylidene groups occur in the same molecule, as in compounds toward the end of the above list, cross-linking results where more than one to two percent thereof is used in forming the copolymer.

The polymers and copolymers have the general usefulness of resinous materials in coating, impregnating or molding compositions. They give thermally stable shaped structures such as fibers and films and they can be hydrolyzed to polyprimary amines which are useful modifying agents for a number of synthetic polymers, and are also useful, for example, for improving the wet strength of papers and as ingredients in adhesives and water paints.

The following examples are illustrative of the invention:

Example 1

A mixture of 11.8 g. (0.1 mole) of methyl allophanate, 24.9 g. (0.3 mole) of 2-aminoethyl vinyl ether and 20 ml. of water is heated in a sealed pressure bottle at 60° to 65° C. for 3 days. The originally two-phase mixture, now a dark red solution, is concentrated under diminished pressure (60°/0.8 mm.) to give 19 g. of brown-red tacky solid. The solid is treated with hot chloroform; the mixture is cooled and filtered, and the residual tan solid is recrystallized from water. The product, $$CH_2=CHOC_2H_4NHCONHCONH_2$$

is obtained as a white solid, M. P. 134° to 136°, in 29% yield, soluble in hot water or hot isopropanol and soluble readily in dimethylformamide or acetone.

*Analysis.*—Calc'd for $C_6H_{11}N_3O_3$: C, 41.6; H, 6.37; N, 24.3. Found: C, 41.68; H, 6.89; N, 23.9.

Example 2

Two grams of the biuret product of Example 1 dissolved in 2 g. of dimethylformamide and catalyzed with 4 drops of dimethylazoisobutyrate is heated in a nitrogen-filled pressure bottle at 75° C. for 16 hours. The resultant viscous solution is treated with hot acetone to extract the unchanged monomer and precipitate 1.74 g. of solid polymer, 87% conversion. The polymer is less than 1% soluble in water, only slightly soluble in acetone but soluble in dimethylformamide.

Example 3

Similarly, the product,

$$CH_2=CHOC_2H_4N(CH_3)CONHCONH_2$$

is obtained by the procedure of Example 1 by substituting 0.3 mole of 2-methylaminoethyl vinyl ether for the vinyl ether used therein. It is polymerized to a water-insoluble polymer by the procedure of Example 2.

Example 4

The product, $CH_2=CHOC_2H_4N(C_6H_{11})CONHCONH_2$, 
is produced by the procedure of Example 1 except that the vinyl ether thereof was replaced by 0.3 mole of 2-(N-cyclohexylamino)-ethyl vinyl ether. Polymerization of the product by the procedure of Example 2 produces a water-insoluble polymer that is soluble in dimethylformamide.

Example 5

A product of the structure,

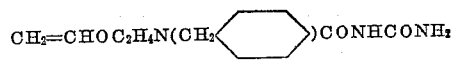

is obtained by the procedure of Example 1 substituting 2-(N-benzylamino)-ethyl vinyl ether for the vinyl ether of the earlier example. It polymerizes under the conditions of Example 2 to a water-insoluble polymer.

*Example 6*

A methylolated derivative is prepared from the polymer obtained in Example 2 by mixing 1 part by weight of the polymer in 99 parts by weight of 5% aqueous formaldehyde and heating the mixture at 60° C. and a pH of 9.0 for 1 hour at which time the conversion to a water-soluble methylolated derivative is completed. This derivative is incorporated in paper pulp in the beater in an amount of 2½%. After drying, th paper has increased an amount of 2½%. After drying, the paper has increased wet strength.

*Example 7*

A reaction vessel is charged with a mixture of 11.8 g. (0.1 mole) of methyl allophanate, 30.3 g. (0.3 mole) of 3-amino-propyl vinyl ether, and 5 cc. of distilled water and is heated at 75° to 80° C. for 40 hours. A homogeneous solution is thereby obtained. On cooling, the product $CH_2=CHOC_3H_6NHCONHCONH_2$ is crystallized out. It is collected by filtration, washed with ice-water and dried, yielding 9.1 g. of light yellow crystals. Recrystallization from water yields white crystals having a M. P. of 118° to 119° C. and containing 44.75% C, 7.01% H, and 22.24% N. The theoretical values corresponding to a product of the structure given above are 44.7% C, 7.5% H, and 22.35% N.

*Example 8*

The product of Example 7 is polymerized by mixing 5 g. of the monomer with 5 g. of dimethylformamide and 0.12 g. of dimethyl azodiisobutyrate and heating the mixture at 75° C, for 16 hours under nitrogen. The Gardner-Holdt viscosity of the resulting solution is J. The polymer is isolated by precipitation with acetone and dried to give 3.6 g. of polymer (72% conversion). The polymer is a fluffy, white solid, very slightly soluble in water, slightly soluble in methanol and readily soluble in dimethylformamide.

*Example 9*

A polymethylol derivative obtained from the polymer by the procedure of Example 6 is soluble in water. It is added to a paper pulp in the beater (2% on the pulp) and the pulp is then adjusted to a pH of 3.0 with HCl. The dried paper shows increased wet strength.

*Example 10*

A mixture of one mole of methyl allophanate, one mole of $CH_2=CHOCH(C_{16}H_{33})CH_2NH_2$, 200 ml. of methanol and 20 ml. of water is charged to a pressure reaction vessel and heated at about 85° C. for 36 hours with good agitation. The precipitated resinous product is washed well with alcohol to remove unchanged amine. The product is largely $$CH_2=CHOCH(C_{16}H_{33})CH_2NHCONHCONH_2$$

*Example 11*

(a) The biuret product (5 parts by weight) of Example 1, 42 parts of ethyl acrylate, 53 parts of methyl methacrylate, 120 parts of ethoxyethyl acetate and 0.5 part of dimethyl azoisobutyrate are mixed and heated at 75° to 90° C. for two hours. The resultant polymer solution is useful as a coating vehicle. Ten parts of this solution, 0.75 part of N,N'-bis-methoxymethylethyleneurea, 0.001 part of p-toluenesulfonic acid, 4 parts of titanium dioxide and 2 parts of xylene are milled to give a smooth, stable white enamel. Coatings applied by spraying and baked at 300° F. and 30 minutes are hard, glossy and completely solvent-resistant with excellent adhesion and flexibility.

(b) An aqueous dispersion of 11% of a copolymer of 87% by weight of butyl acrylate and 13% by weight of the biuret obtained in Example 3 prepared by emulsion copolymerization in the presence of ammonium persulfate (2% on the weight of monomers) and an octylphenoxypolyethoxyethanol containing about 12 oxyethylene units (3% on the weight of monomers) is applied to a wool fabric, depositing approximately 8% thereon. After drying, the fabric exhibited markedly reduced shrinkage on washing.

*Example 12*

A mixture of 1 mole of ethyl allophanate and 3 moles of $CH_2=CHOCH(C_3H_7)CH_2NHCH_3$ is reacted under the conditions given in Example 10. The product is polymerized under the conditions of Example 2 and the polymer is converted to a methanol-soluble methylol derivative by reacting with formaldehyde in methanol. The methylolated derivative is applied to a rayon fabric from a 7.5% solution at a pH of 2.5. On drying and heating at 110° C. for ten minutes, the derivative is insolubilized on the fabric and renders the fabric more resistant to creasing and less susceptible to shrinkage on repeated washing.

*Example 13*

Nine parts by weight of acrylonitrile are copolymerized with one part by weight of the biuret obtained in Example 7 in 20 parts of dimethylformamide using 0.4 part of azodiisobutyronitrile as the initiator at 65° for 6 hours. Fibers obtained by extrusion into a coagulating medium, such as water, of a 20% solution of this copolymer in dimethylformamide are readily dyed with acid dyes and have excellent fastness to scouring.

*Example 14*

(a) The procedure of Example 7 is followed except that there is substituted for the amine of Example 7 each of the following amines in successive runs:

(1)
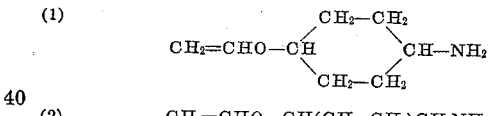

(2) 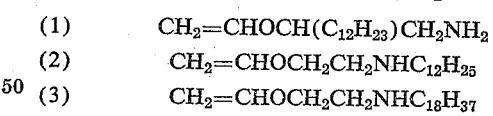

The corresponding biurets are obtained and isolated.

(b) The procedure of Example 10 is followed except that the amine therein is entirely replaced with each of the following amines in successive runs. In each case, the corresponding biuret is the major product.

(1)      $CH_2=CHOCH(C_{12}H_{23})CH_2NH_2$ (2)      $CH_2=CHOCH_2CH_2NHC_{12}H_{25}$ (3)      $CH_2=CHOCH_2CH_2NHC_{18}H_{37}$

The compounds of this invention are distinguished by two important structural features. The first is the vinyl ether portion. This contributes reactivity with a wide range of active-hydrogen containing materials as well as reactivity with aminoplast resins in the presence of acid catalysts. This group also contributes polymerizability with cationic initiators such as boron trifluoride, aluminum chloride and in conjunction with the rest of the molecule polymerizability with free-radical initiators particularly azo-type initiators. The vinyl ethers of this invention possess a desirable combination of thermal and storage stability, high reactivity to free-radical initiators, and the ability to give high polymers with little degradative chain-transfer which are especially useful for making fibers as well as coatings.

A second important function present in these compounds is the biuret group. It imparts to the vinyl ether group markedly enhanced reactivity toward free-radical initiators as compared with alkyl vinyl ethers. Surprisingly, the compounds of this invention are not cyclic, retaining their vinyl ether group throughout the synthesis. The biuret group contributes reactivity with aldehydes, epoxides, isocyanates, alkali metals, acid chlorides and the like. The biuret group contributes valuable properties with regard to solubility, physiological activity and performance which are completely unpredictable. The biuret group is an acidic group as differentiated from such groups as amides, ureas and carbamates and readily forms salts with alkali metals such as lithium, sodium or potassium. Such salts may be alkylated as with alkyl halides to form valuable new derivatives. The acidity of these compounds is, however, controlled and does not impair their use in applications where relatively neutral materials are desired. It may be described as a reservoir of acidity present upon demand of suitable reagents.

It is to be understood that changes and variations may be made without departing from the spirit and scope of the invention as defined in the appended claims.

I claim:

1. A composition comprising a compound of the formula $$CH_2=CHOC_2H_4NHCONHCONH_2$$

2. A composition comprising a compound of the formula $$CH_2=CHOC_3H_6NHCONHCONH_2$$

3. A composition comprising a compound of the formula $$CH_2=CHOC_2H_4N(CH_3)CONHCONH_2$$

4. A composition comprising a compound of the formula $$CH_2=CHOC_2H_4N(C_6H_{11})CONHCONH_2$$

5. A composition comprising a compound of the formula $$CH_2=CHOCH(C_{16}H_{33})CH_2NHCONHCONH_2$$

6. A composition comprising a polymer of a compound of the formula $$CH_2=CHOC_2H_4NHCONHCONH_2$$

7. A composition comprising a polymer of a compound of the formula $$CH_2=CHOC_3H_6NHCONHCONH_2$$

8. A composition comprising a polymer of a compound of the formula $$CH_2=CHOC_2H_4N(CH_3)CONHCONH_2$$

9. A composition comprising a polymer of a compound of the formula $$CH_2=CHOC_2H_4N(C_6H_{11})CONHCONH_2$$

10. A composition comprising a polymer of a compound of the formula $$CH_2=CHOCH(C_{16}H_{33})CH_2NHCONHCONH_2$$

11. A composition comprising a substituted biuret having the Formula I (I) $$CH_2=CHOANRCONHCONH_2$$

where R is selected from the group consisting of hydrogen, benzyl, cyclohexyl, and alkyl groups of 1 to 18 carbon atoms, and A is a divalent hydrocarbon group selected from the class consisting of straight and branched chain alkylene groups of 2 to 18 carbon atoms and alkylene groups substituted by a member selected from the group consisting of cyclohexyl and saturated and unsaturated aliphatic hydrocarbon substituents, at least two of the carbon atoms of the alkylene group separating the adjoining oxygen atom from the adjacent nitrogen atom.

12. A composition comprising a copolymer of a compound of claim 11 with an ester of a member of the group consisting of acrylic and methacrylic acids.

13. A composition comprising a polymer of a compound of claim 11.

14. A method comprising reacting, in the presence of a small amount of water at a temperature of 20° C. to 100° C., a compound of Formula II with an alkyl allophanate of Formula III:

(II) $$CH_2=CHOANHR$$

(III) $$R'OCONHCONH_2$$

where R' is an alkyl group, R is selected from the group consisting of hydrogen, benzyl, cyclohexyl, and alkyl groups of 1 to 18 carbon atoms, and A is a divalent hydrocarbon group selected from the class consisting of straight and branched chain alkylene groups of 2 to 18 carbon atoms and alkylene groups substituted by a member selected from the group consisting of cyclohexyl and saturated and unsaturated aliphatic hydrocarbon substituents, at least two of the carbon atoms of the alkylene group separating the adjoining oxygen atom from the adjacent nitrogen atom, and recovering from the reaction mass a compound of claim 11.

15. A method as defined in claim 14 in which the allophanate is methyl allophanate.

16. A method comprising reacting urea, at a temperature of 20° C. to 100° C., with an isocyanate having the Formula V:

(V) $$CH_2=CHOYC(CH_3)_2NCO$$

where Y is an alkylene group of 1 to 15 carbon atoms.

References Cited in the file of this patent

UNITED STATES PATENTS

| | | |
|---|---|---|
| 2,304,369 | Morgan et al. | Dec. 8, 1942 |
| 2,601,251 | Bruson | June 24, 1952 |
| 2,689,844 | Melamed | Sept. 21, 1954 |
| 2,694,696 | Melamed | Nov. 16, 1954 |